Figure 1:
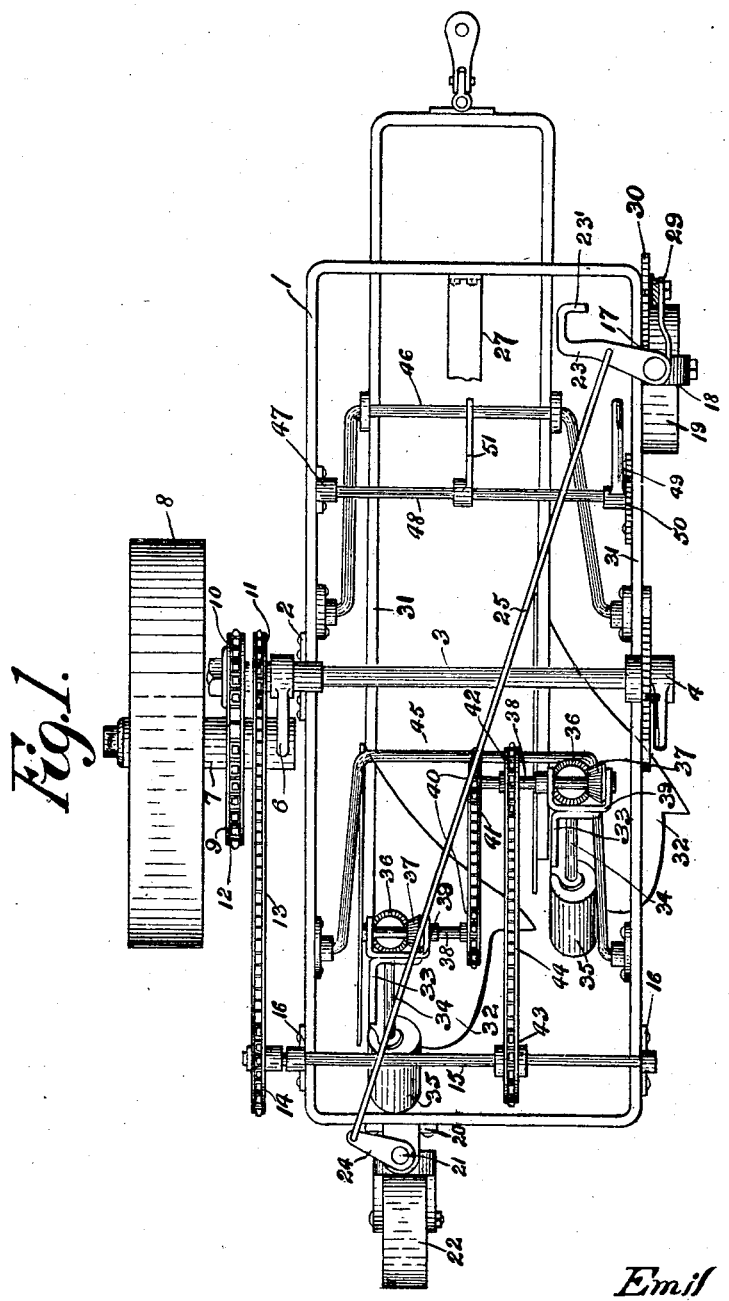

E. DAVIDSON.
ATTACHMENT FOR PLOWS.
APPLICATION FILED JULY 1, 1909.

969,091.

Patented Aug. 30, 1910.
2 SHEETS—SHEET 1.

Witnesses
J. R. Woodworth
L. N. Gillis

Inventor
Emil Davidson.
By Chandler & Chandler
Attorney

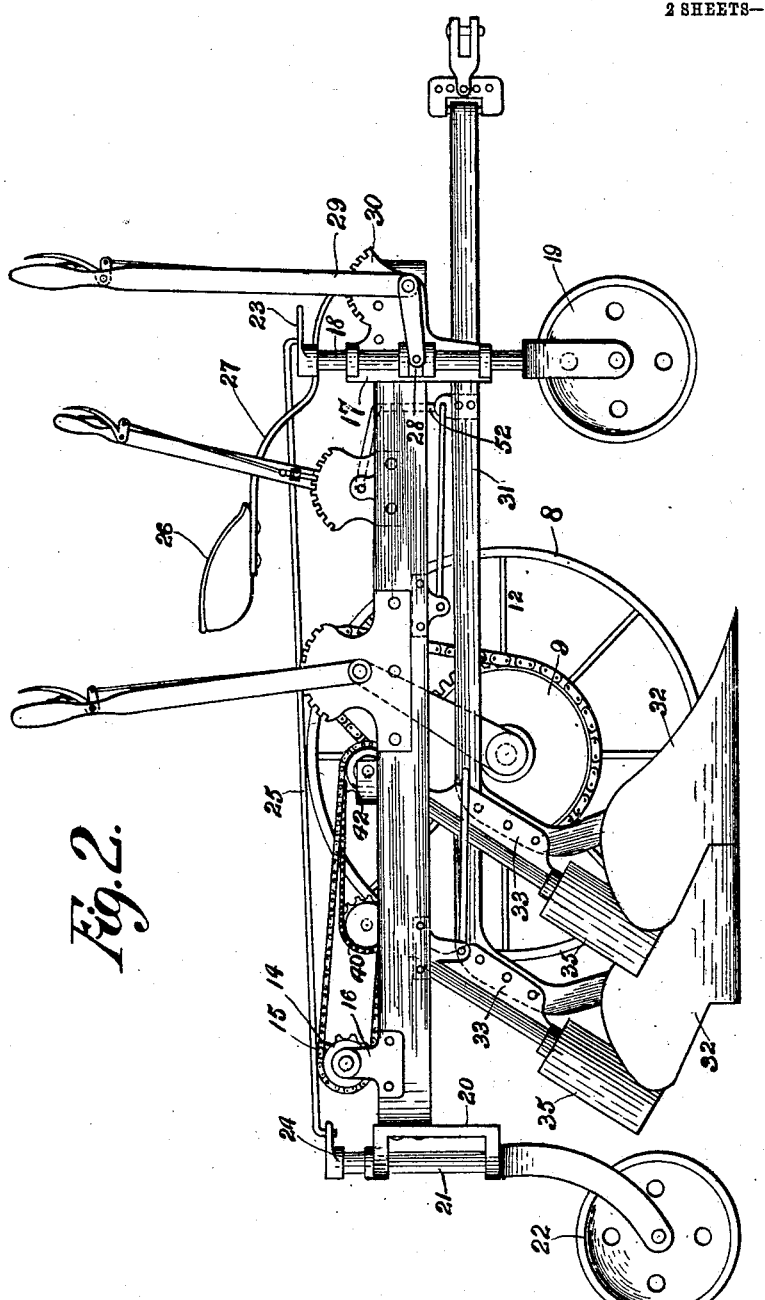

UNITED STATES PATENT OFFICE.

EMIL DAVIDSON, OF SHARON, NORTH DAKOTA.

ATTACHMENT FOR PLOWS.

969,091.  Specification of Letters Patent.  Patented Aug. 30, 1910.

Application filed July 1, 1909. Serial No. 505,479.

*To all whom it may concern:*

Be it known that I, EMIL DAVIDSON, a citizen of the United States, residing at Sharon, in the county of Steele, State of North Dakota, have invented certain new and useful Improvements in Attachments for Plows; and I do hereby declare the following to be a full, clear, and exact description of the invention, such as will enable others skilled in the art to which it appertains to make and use the same.

This invention relates to wheeled plows and has for its object to improve the same in the several particulars hereinafter noted.

To the above ends the invention consists of the novel devices and combinations of devices hereinafter described and defined in the claims.

In the accompanying drawings which illustrate the invention, like characters indicate like parts throughout the several views.

Referring to the drawings, Figure 1 is a plan view, and Fig. 2 is a side elevation, showing the improved plow.

The plow is provided with a rectangular metallic main frame 1, in suitable bearings 2 on the central side portions of which is mounted a transverse rock shaft 3. This rock shaft 3, at one end, is provided with a latch lever 4 that coöperates with a fixed lock segment on the adjacent side of said frame 1, and at its other end said rock shaft is provided with a strong depending arm 6 which, at its free end, is provided with a heavy outwardly projecting trunnion 7. The said parts 3, 6 and 7 constitute a crank shaft. On the trunnion 7 is loosely journaled a traction wheel 8 which carries a sprocket wheel 9 on its hub. On the projecting end of the rock shaft 3 is loosely journaled a pair of sprocket wheels 10 and 11 that are secured to a common hub. A sprocket chain 12 runs over the alined sprockets 9 and 10. A sprocket chain 13 runs over the sprocket 11 and over a sprocket 14 on a transverse rear shaft 15 mounted in suitable bearings 16 on the rear side portions of the frame 1. In a suitable bearing bracket 17 secured to the right hand forward side portion of the main frame 1 is journaled a vertically extended wheel post 18, to the lower end of which is journaled a ground wheel 19. In another bearing bracket 20 secured to the rear portion of the frame 1, at the right hand side of its transverse center is another wheel post 21, in the lower portion of which is journaled a ground wheel 22. The ground wheels 19 and 22 are relatively small as compared with the traction wheel 8. At their upper ends the wheel posts 18 and 21 are provided, respectively, with approximately parallel crank arms 23 and 24, that are connected for parallel movement by a long oblique connecting rod 25. The arm 23 is preferably provided with an extension 23′ that is in the form of a foot-piece so located that it may be reached by the foot of the driver while on the seat 26, which seat is shown as supported by a strong bar 27 from the front portion of the main frame 1.

The wheel post 21 is fixed against endwise sliding movements with respect to the bearing bracket 20, but the wheel post 18 is mounted for vertical movements in its coöperating supporting bracket 17 and at its central portion is provided with a grooved shipper collar 28, in the groove of which works the laterally projecting free end of a lifting lever 29, which lever is shown as pivoted to and the latch of which coöperates with a lock segment 30 shown as formed integral with the body of the said bracket 17. By means of this latch lever 29 the forward right hand portion of the main frame 1 may be raised or lowered and set in different vertical adjustments. As is evident, the left hand side of the machine may be raised and lowered by an oscillatory movement of the crank arm 6 which carries the traction wheel 8 forward and rearward with respect to the rock shaft 3.

The plow beams 31 of which, as shown, there are two, are rigidly connected at their forward ends and are preferably tied at their intermediate portion by suitable lateral braces. The plows 32 are rigidly connected to the depending rear ends of the plow beams 31. Mounted in suitable bearing brackets 33 secured to the rear portions of the plow beams 31 above the plows, are obliquely set shafts 34, which at their lower ends are provided with rigidly secured rollers 35 that are positioned to be extended in a downwardly and rearwardly inclined direction across the rear upper edge of the mold boards of the plows, and when positively driven assist materially in turning the uplifting furrow. At their upper ends, these shafts 34 are provided with miter gears 36 that mesh with miter gears 37 secured on short shafts 38 mounted in the pronged upper end portions 39 of the bearing brackets. The shafts 38 at their inner ends are provided with alined sprockets 40, over which a sprocket chain 41 is mounted to run. The most forward of the said two shafts 38 is also provided with a sprocket 42 that alines with the sprocket 43 on the counter-shaft 15. A sprocket chain 44 runs over the said alined sprockets 42 and 43.

The plow beams 31 and parts connecting the same constitute a supplemental frame which is supported for vertical movement with respect to the main frame 1. This is preferably done by means of a pair of parallel suspending bails 45 and 46. The rearward prongs of these bails 45 and 46 are pivotally connected to the sides of the main frame 1 and the transverse forward portions of the said bails are pivotally connected to the plow beams 31.

Mounted in suitable bearings 47 on the main frame 1 is a transverse rock shaft 48 which at one end is provided with a lifting lever 49 provided with the usual latch lever actuating a latch that coöperates with a notched latch segment 50 secured, as shown, to the right hand side of the said main frame 1. At its intermediate portion the rock shaft 48 is provided with a forwardly projecting arm 51 that is connected by a link 52 to the intermediate transverse portion of the forward crank bail 46. As is evident, by a rearward movement of the lever 49 the forwardly projecting transverse portion of the bail 46 and, hence, the forward portion of the supplemental frame, made up of the plow beams 31, will be raised and it is of course evident that as soon as the two bails 45 and 46 are connected for parallel movements, the movement of one of the bails will correspondingly move the other bail and thereby raise or lower the plow beams and plows according to the direction of movement of the said bails and lifting lever 49.

The machine, it will be understood, may be steered by the parallel oscillatory movement of the wheels 19 and 22, and this movement may be readily controlled by the operator through a manipulation of the footpiece 23' and arm 23 to which it is applied.

Having thus described the invention, what is claimed as new, is:—

1. An attachment for turning plows comprising a bracket adapted for attachment to a plow standard, a sleeve formed on said bracket and arranged to extend downwardly and rearwardly behind said standard, a shaft carried therein, a roller mounted on the lower end of the shaft to extend downwardly and rearwardly across the rear upper edge of a mold board, and means at the upper end of the shaft adapted for driving the same.

2. An attachment for turning plows comprising a bracket adapted for attachment to a plow standard, a sleeve formed on said bracket and arranged to extend downwardly and rearwardly behind said standard, a shaft carried therein, a cylindrical roller mounted on the lower end of the shaft to extend downwardly and rearwardly across the rear upper edge of a mold board, bearings formed on said bracket at the upper end of the sleeve, a second shaft carried in said bearings, meshing bevel gears on said shafts, and a sprocket on the second shaft.

In testimony whereof, I affix my signature, in presence of two witnesses.

EMIL DAVIDSON.

Witnesses:
T. O. CHANTLAND,
O. M. HILSTAD.